US006495803B2

(12) United States Patent
Vetrano

(10) Patent No.: US 6,495,803 B2

(45) Date of Patent: Dec. 17, 2002

(54) SLEEVE SHRINKING QUICK DIP SYSTEM

(75) Inventor: Carmine J. Vetrano, Medford, MA (US)

(73) Assignee: 3SAE Technologies, Inc., Woburn, MA (US)

( * ) Notice: Subject to any disclaimer, the term of this patent is extended or adjusted under 35 U.S.C. 154(b) by 0 days.

(21) Appl. No.: 10/034,940

(22) Filed: Dec. 26, 2001

(65) Prior Publication Data

US 2002/0092841 A1 Jul. 18, 2002

Related U.S. Application Data

(63) Continuation-in-part of application No. 09/723,600, filed on Nov. 28, 2000, now abandoned.

(51) Int. Cl.[7] .......... H05B 3/06; F27B 9/00; G02B 6/255; B29C 27/20; B29C 63/42

(52) U.S. Cl. .......... 219/393; 219/392; 219/385; 219/521; 264/1.25; 264/2.7; 392/416

(58) Field of Search .......... 219/393, 392, 219/385, 386, 411, 521; 264/1.25, 2.7; 392/416, 418

(56) References Cited

U.S. PATENT DOCUMENTS 3,515,853 A * 6/1970 McAdams .......... 392/418
3,654,429 A * 4/1972 Strachan .......... 392/409
4,460,820 A * 7/1984 Matsumoto et al. .......... 219/385
4,680,449 A * 7/1987 Yamada et al. .......... 219/385
4,719,332 A * 1/1988 Markuson, Jr. .......... 219/388
4,749,843 A * 6/1988 Abramson .......... 219/411
4,764,662 A * 8/1988 Andersen et al. .......... 219/385
4,790,067 A * 12/1988 Grindle .......... 219/229
5,060,289 A * 10/1991 Abramson .......... 392/418
5,384,889 A * 1/1995 Cook .......... 219/385

FOREIGN PATENT DOCUMENTS

JP 59-215820 * 12/1984
JP 8-5857 * 1/1996
JP 08-005857 1/1996
JP 10-332979 * 12/1998

* cited by examiner

*Primary Examiner*—Joseph Pelham
(74) *Attorney, Agent, or Firm*—McDermott, Will & Emery

(57) ABSTRACT

A system and method for quickly heating a shrinkable casing around a relatively non-shrinkable object. The system may be referred to as a sleeve shrinking quick dip heat system. As one example, the present invention may be used to shrink a sleeve around a strand, such as fiber or copper. In the electrical and electronic fields, the present invention may be used to shrink sleeves or tubing around, for example, copper strands, wires, connectors, or components. A contact approach to heating the a loaded sleeve is used wherein a predetermined temperature profile is applied to prevent the trapping of air during shrinking. Ramp-up time is eliminated by use of a heater block that remains near or at heat shrinking temperatures, while selectively transferring heat to the sleeve according to the desired temperature profile.

29 Claims, 4 Drawing Sheets

100 120 130 102 190 140 104 162 180 150 155 106 108 160

182 180 150 157 156

SLEEVE SHRINKING QUICK DIP SYSTEM

CROSS REFERENCE TO RELATED APPLICATIONS

This application is a continuation-in-part application of commonly owned U.S. patent application Ser. No. 09/723,600, filed Nov. 28, 2000 now abandoned, entitled QUICK HEATING HEAT-SHRINK SLEEVES, from which it claims the benefit of priority.

FIELD OF THE INVENTION

The present invention generally relates to systems and methods for quickly shrinking encasing materials.

BACKGROUND OF THE INVENTION

To an ever increasing degree, fiber optic cabling and technology is being implemented in telephone, computer, and other networks. Additionally, fiber optic technology is increasingly being implemented at the device level, e.g., within computer devices and components. As a result, demand for fiber optic technology continues to increase. With this demand, comes a strong need to produce or prepare (i.e., process) fiber optic cables quickly and in high volume. A typical fiber optic cable includes an optical fiber strand encased by a protective sleeve or coating. Preparation of such a cable can include splicing strands together, which requires stripping the protective sleeve of coating from the strand. In such a case, once spliced, the spliced region of the strand requires protection, such as with a heat shrinkable sleeve.

The sleeve may be comprised of any of a variety of optically opaque materials that can be shrunk onto the fiber strand. Such sleeves are usually made out of some form of shrinkable polymer and are made to be of a diameter sufficiently large so that the fiber strand can be easily slipped (or loaded) into the sleeve, referred to as a "loaded sleeve".

With current technology, a loaded sleeve is positioned in a fixed relatively cool convection oven. Such ovens typically require an operator to position the loaded sleeve in the oven for heating and shrinking, so the oven is returned to a relatively cool temperature to lower the risk of heat related injury or damage. Once the loaded sleeve is in the oven, and the oven is closed, the oven is turned. After about sixty (60) to ninety (90) seconds the oven heats up to the temperature required to shrink the sleeve onto the strand (i.e., a target heat shrink temperature). A typical heat shrink temperature is about a minimum of 90° C. to about 240° C., depending on the sleeve.

The time it takes for the oven to achieve its target heat shrink temperature is referred to as the temperature ramp-up time. When the oven reaches the heat shrink temperature, the sleeve begins the process of shrinking around the fiber strand. Once the loaded sleeve has been in the oven and heated at the heat shrink temperature for an adequate amount of time, the sleeve is shrunk to snuggly encase the strand. The loaded sleeve is then removed from the oven and placed in a cool down area. Again, this is performed by the operator. Meanwhile, the oven also cools down. Later, it is reheated to process another loaded sleeve.

As a result, current technology requires a heat shrink cycle time of approximately sixty (60) to ninety (90) seconds from start to finish to shrink a sleeve around a fiber strand, depending on the characteristics of the sleeve (e.g., diameter, thickness, and composition), the heat shrink temperature, the oven's temperature ramp-up time, and the speed of the operator.

One problem with the current approach is that the processing of fiber optic cables is limited by the relatively long heat shrink cycle time. Additionally, the typical approach does not economically lend itself to automation, which might offer some reduction in the heat shrink cycle time.

As a result, among other things, it is an object of the present invention to reduce the heat shrink cycle time of fiber optic cable processing, and thereby facilitate larger volumes of fiber optic cable processing in shorter amounts of time. It is another object of the present invention, to apply these same benefits in other than fiber optic processing, where shrinkable sleeves or encasings are useful.

SUMMARY OF THE INVENTION

The present invention provides a system and method for quickly heating a shrinkable casing around a relatively non-shrinkable object. The system may be referred to as a sleeve shrinking quick dip heat system. As one example, the present invention may be used to shrink a sleeve around an optical fiber strand. In the electrical and electronic fields, the present invention may be used to shrink sleeves or tubing around, for example, copper strands, wires, connectors, or components. Collectively, these strands, wires, connectors, devices, and components are referred to as "strands". In the fiber optic field, sleeves are typically made of some form of optically opaque polymer, known in the art. This same type of material can also be used in the electrical or electronic fields. For example, those skilled in the art will appreciate that the present invention may be used with typical heat shrinkable dual wall sleeves and tubing. Collectively, the heat shrinkable materials, casings, sleeves, and tubing are referred to as "sleeves".

In accordance with the present invention, a heater assembly is provided that includes a loaded sleeve holder, a heating block and a heater element, encased in a heating chamber. In order to shrink sleeves around a fiber strand, as an example, the strand is loaded into a sleeve, such that the sleeve loosely encases the strand. The loaded sleeve is positioned in the loaded sleeve holder for shrinking. The heater block, which is thermally coupled to the heater element, is brought into contact with the sleeve holder, which maybe in the form of a channel that supports the loaded sleeve. In one form, the heater block is movable, so it is moved to contact the sleeve holder. In another form, the sleeve holder is movable, and moved to contact the heater block. In yet another form, the heater block and sleeve holder may each be movable, so they move together until contact.

In typical heat shrinkable sleeves, heat shrink temperatures range from about 90° C. to 240° C., depending on the physical and thermal parameters of the sleeve. It is, of course, presumed that the strand is capable of withstanding the heat shrink temperature and duration required to shrink the sleeve. In the present invention, the heater block is maintained at the heat shrink temperature for successive shrinking operations, without the requirement of temperature ramp-up for each heat shrinking operation. Other temperatures and ranges can also be accommodated, depending on the characteristics of the sleeves.

The heater block is formed from a material that is highly thermally conductive, such as to aluminum. The heater block is thermally coupled to the heating element (or cartridge), and preferably maintained at or near the heat shrink temperature of the sleeve being shrunk. A heat sensor may be included to monitor the temperature of the heater block. Unlike a convection oven, the temperature inside the heating chamber need not achieve the heat shrink temperature, since the present invention uses local (e.g., contact) heating. That is, in one form, the heater block is made to contact the sleeve holder. The heat is transferred to the sleeve holder, according to the temperature profile of the sleeve holder, and the sleeve holder then transfers the heat to the sleeve for shrinking. In one form, once a door to the heating chamber is closed, the heating block moves to meet the stationary sleeve holder for heating, and then retracts once heating is accomplished. A user interface is provided with the chamber to adjust and monitor the temperature of the heating block, as well as to control the movement of the heater block and/or sleeve holder.

In order to maintain the loaded sleeve in position for shrinking, the stand holder includes a channel within which the loaded sleeve is placed. The sleeve holder is preferably made from a material having a low thermal mass and a high thermal conductivity, such as aluminum, steel, or copper (as examples). As a result, the sleeve holder heats up and cools down quickly. The sleeve holder is heated when placed in contact with the already heated heater block, so high thermal conductivity allows the sleeve holder to heat quickly, saving time. The low thermal mass allows the sleeve holder to cool quickly, making it safe.

The heater block includes a sleeve holder engager. The sleeve holder engager and/or the sleeve holder are configured to achieve a predetermined temperature profile. If sleeves are shrunk such that the center and ends are shrunk at the same time there is a chance that air bubbles will be trapped inside the sleeve, which can degrade the performance characteristics of the cable. Accordingly, in one form of the present invention, a high yield heat shrinking process is obtained by shrinking the sleeve from the center toward its ends. This approach forces the air out of both ends of the sleeve as the sleeve shrinks from the center outward. In such a case, the sleeve holder engager and/or sleeve holder are configured such that the shrink temperature transferred to the center of the loaded sleeve is slightly higher than at the loaded sleeve's ends, so the sleeve shrinks more quickly at its center.

This can be accomplished in a variety of manners. In a first manner, a decreasing amount of contact is provided between the sleeve holder and the ends of the loaded sleeve. Heat sinking the ends of the sleeve holder provides another approach to keeping the ends cooler than the center of the sleeve holder. In another form, a decreasing amount of contact between the heater block and the ends of the sleeve holder (e.g., the sleeve holder can be made to be longer than the heater block. In another form, the composition of the sleeve holder is such that the thermal connectivity at the center is greater than it is at its ends. In yet another form, a thermal resistance within the cross section of the of the sleeve loader is such that there is a "time lag" before the ends reach the heat shrink temperature. Such thermal resistance can be achieved by providing holes in the sleeve loader between its center and its ends. In any of these various approaches, a thermal gradient is provided between the center and ends of the sleeve holder, with the highest temperatures at the center, at least initially.

In another form of the present invention, a high yield heat shrinking process may be obtained by shrinking the sleeve from one end to the other end. In such cases, the temperature applied to a loaded sleeve at a first end is greater than it is a second, opposite end. According to this approach, air is forced out of the second end of the sleeve as the sleeve shrinks from the first end. Such temperature gradients may be formed in any of a variety of manners, as discussed above.

BRIEF DESCRIPTION OF THE DRAWINGS

The foregoing and other objects of this invention, the various features thereof, as well as the invention itself, may be more fully understood from the following description, when read together with the accompanying drawings, described.

For the most part, and as will be apparent when referring to the figures, when an item is used unchanged in more than one figure, it is identified by the same alphanumeric reference indicator in all figures.

DETAILED DESCRIPTION OF THE PREFERRED EMBODIMENT

The present invention provides a system and method for quickly heating a shrinkable casing around a relatively non-shrinkable object. The system may be referred to as a sleeve shrinking quick dip heat system. As one example, the present invention may be used to shrink a sleeve around an optical fiber strand. In the electrical and electronic fields, the present invention may be used to shrink sleeves or tubing around, for example, copper strands, wires, connectors, or components. Collectively, these strands, wires, connectors, devices, and components are referred to as "strands". In the fiber optic field, sleeves are typically made of some form of optically opaque polymer, known in the art. This same type of material can also be used in the electrical or electronic fields. For example, those skilled in the art will appreciate that the present invention may be used with typical heat shrinkable dual wall sleeves and tubing. Collectively, the heat shrinkable materials, casings, sleeves, and tubing are referred to as "sleeves".

Figure 1:
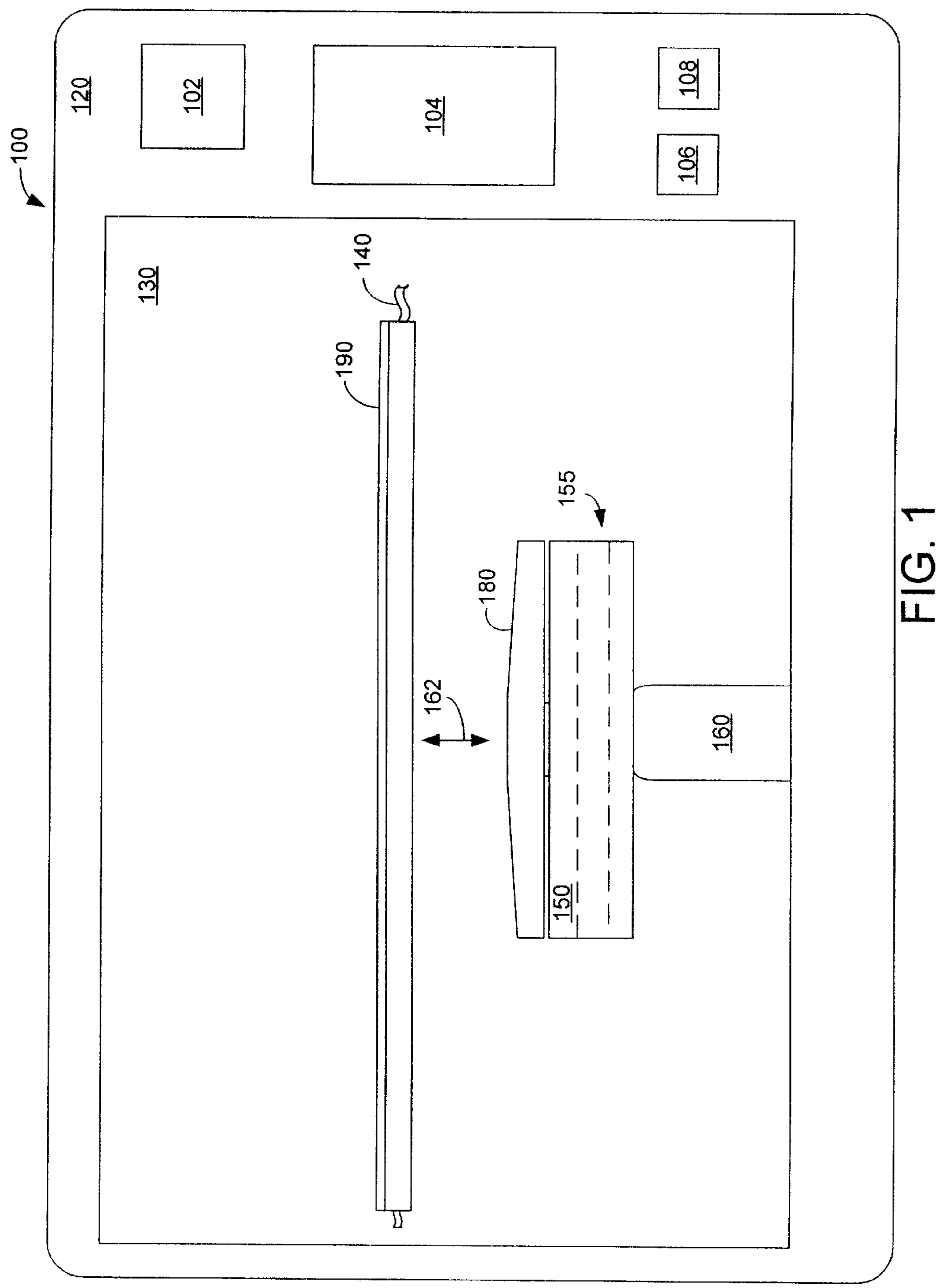
FIG. 1 is a front view of a sleeve shrinking oven in accordance with the present invention.

FIG. 1 shows one embodiment of a quick dip system 100 in accordance with the present invention. As is shown, quick dip system 100 includes a loaded sleeve holder 190, a heating block 150 and a heater element, encased in an optional heating chamber 120, a chamber need not be provided. Heater block 150 includes a loaded sleeve engager 180. In order to shrink sleeves around a fiber strand, as an example, the strand is loaded into a sleeve, such that the sleeve loosely encases the strand. The loaded sleeve 140 is positioned in the loaded sleeve holder 190 for shrinking. In this embodiment, the heater element is a heater cartridge 155 configured to achieve temperatures of up to about 300° C. Such cartridges are known in the art. The heater cartridge, shown in dashed line form in FIG. 1, runs through the heater block 150.

The heater block 150 is coupled to an arm 160 configured to selectively raise the heater block 150 into contact with sleeve holder 190. Once the heat shrinking cycle is complete, arm 160 then lowers the heater block 150 out of contact with sleeve holder 190. This motion is depicted with arrow 162. A shield, not shown, may be included behind which the heater block 150 may retract when not in use. In another form, the sleeve holder may be movable, and moved to contact the heater block 150. In yet another form, the heater block 150 and sleeve holder 190 may each be movable, so they move together until contact. In any of these cases, a shield (if included) may also be configured to move in and out of position in response to use of the heater block 150.

The heater block 150 (including loaded sleeve engager 180 and heat cartridge 155), sleeve holder 190, and loaded sleeve 140 preferably reside within heating chamber 120, i.e., within void region 130. The heating chamber 120 includes a door, which is not shown, to seal the chamber during its use. Exterior to the heating chamber 120, is preferably a set of user devices that facilitate monitoring and control of the quick dip system 100. In this case, a start (or "ON") button 106 and a stop (or "OFF") button 108 may be included. An output display 102 is provided to display the temperature of the heater block 155. A set of controls 104 (e.g., a keypad, dial, knobs, buttons, and so on) is provided to enter the required heat shrink temperature, or to enter or control other parameters of the quick dip system 100.

Typical loaded sleeves 140 are either about 10 mm, 23 mm, 40 mm, or 60 mm in length. The chamber 120 is made to accommodate any such sleeve, and could be configured to accommodate even larger sleeves. Accordingly, sleeve holders 190 may also be configured to accommodate other loaded sleeve lengths. Therefore, there may be a different sleeve holder 190 for 10 mm lengths, 23 mm, 40 mm lengths, and 60 mm lengths. The present invention, therefore, contemplates sleeve holders 190 being easily swapped in and out, depending on the length of the sleeve to be shrunk. Therefore, each sleeve holder 190 may be fixed in chamber interior 130 with non-permanent means.

In typical heat shrinkable sleeves, heat shrink temperatures range from about 90° C. to 240° C., depending on the physical and thermal parameters of the sleeve. It is, of course, presumed that the strand is capable of withstanding the heat shrink temperature and duration required to shrink the sleeve. In the present invention, the heater block 150 (including loaded sleeve engager 180) is maintained at the heat shrink temperature by heat cartridge 155 for successive shrinking operations, without the requirement of temperature ramp-up for each heat shrinking operation. Other temperatures and ranges can also be accommodated, depending on the characteristics of the sleeves.

Figure 2:
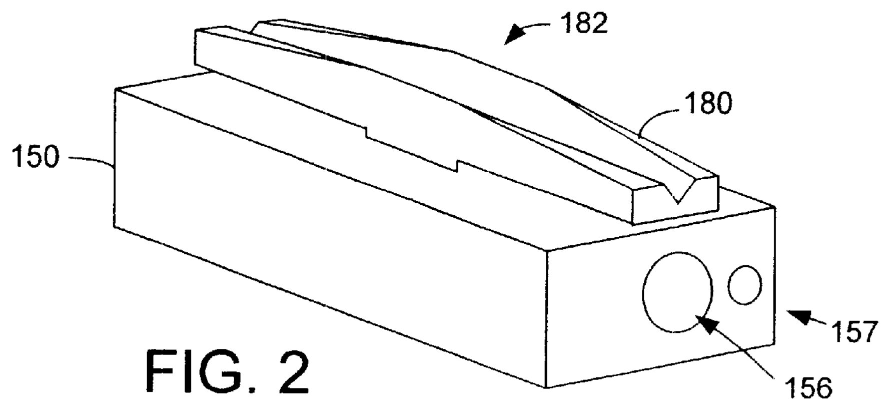
FIG. 2 is a side view of the heater block of FIG. 1.

The heater block 150, shown in greater detail in FIG. 2, is formed from a material that is highly thermally conductive, such as aluminum. A cylindrical cavity 156 is formed within the heater block 150, within which the heat cartridge 155 is disposed to thermally coupled the heat cartridge 155 to the heater block 150. As mentioned, the heat cartridge 155 maintains the heater block at or near the heat shrink temperature for the sleeve being shrunk. A heat sensor (not shown, but known in the art) may be included in the cartridge 155 to monitor the temperature of the heater cartridge 155 or heater block 150. In this embodiment, a screw cavity 157 is formed in heater block 150, used to secure the heat cartridge 155 to heater block 150. Unlike a convection oven, the temperature inside the heating chamber interior 130 need not achieve the heat shrink temperature, since the present invention uses local (e.g., contact) heating. That is, in one form, the heater block 150 is made to contact the sleeve holder 190. The heat is transferred to the sleeve holder 190, according to the temperature profile of the sleeve holder 190 (and loaded sleeve engager 180), and the sleeve holder 190 then transfers the heat to the sleeve of loaded sleeve 140 for shrinking.

Figure 3A:
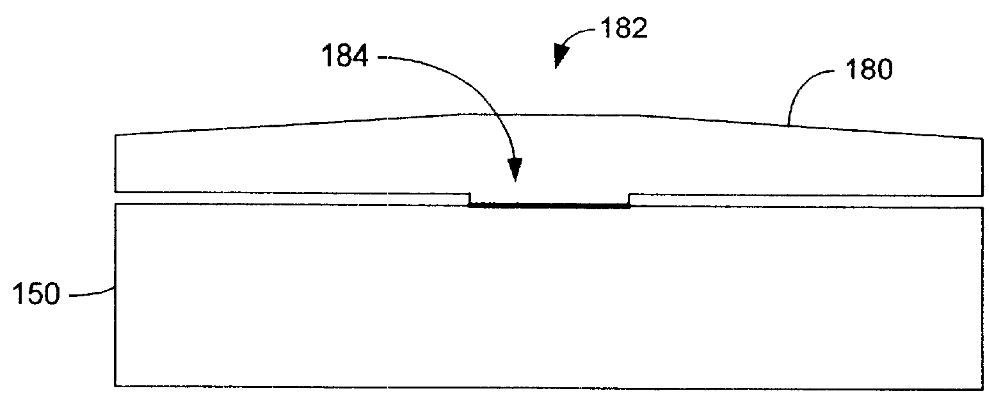
FIG. 3A is a prospective view of the heater block of FIG. 2.

As is shown in FIG. 2 and FIG. 3A, the loaded sleeve engager 180 of the heater block 150 includes a V-channel 182 that mates with the sleeve holder 190, by which the heat is transferred. Heater block 150 is preferably made from a single block of material, with (optionally) a narrow portion 184 formed that may focus the temperature toward the center of the loaded sleeve engager 180, in accordance with the desired temperature profile. FIG. 3A shows a side view depicting this configuration more clearly.

In order to maintain the loaded sleeve 140 in position for shrinking, the loaded sleeve holder 190 includes a channel within which the loaded sleeve is placed. The loaded sleeve holder 190 is preferably made from a material having a low thermal mass and a high thermally conductivity, such as aluminum, steel, or copper (as examples). As a result, the sleeve holder 190 heats up and cools down quickly. The sleeve holder 190 is heated when placed in contact to the already heated loaded sleeve engager 180 of heater block 150, so high thermal conductivity allows the sleeve holder 190 to heat quickly, saving time. The low thermal mass allows the sleeve holder 190 to cool quickly, making it safe.

The sleeve holder 190 and/or loaded sleeve engager 180 are configured to achieve a predetermined temperature profile. In a first form, the temperature profile ensures that higher temperatures occur at the center of the loaded sleeve 140. If sleeves are shrunk such that the center and ends are shrunk at the same time there is a chance that air bubbles will be trapped inside the sleeve, which can degrade the performance characteristics of the cable. Therefore, in one form of the present invention, a high yield heat shrinking process is obtained by shrinking the sleeve from the center toward its ends. This approach forces the air out of both ends of the sleeve as the sleeve shrinks from the center outward. In such a case, the sleeve holder 190 is configured such that the shrink temperature transferred to the center of the loaded sleeve 140 is slightly higher than at the stand's ends, so the sleeve shrinks more quickly at its center.

Figure 3B:
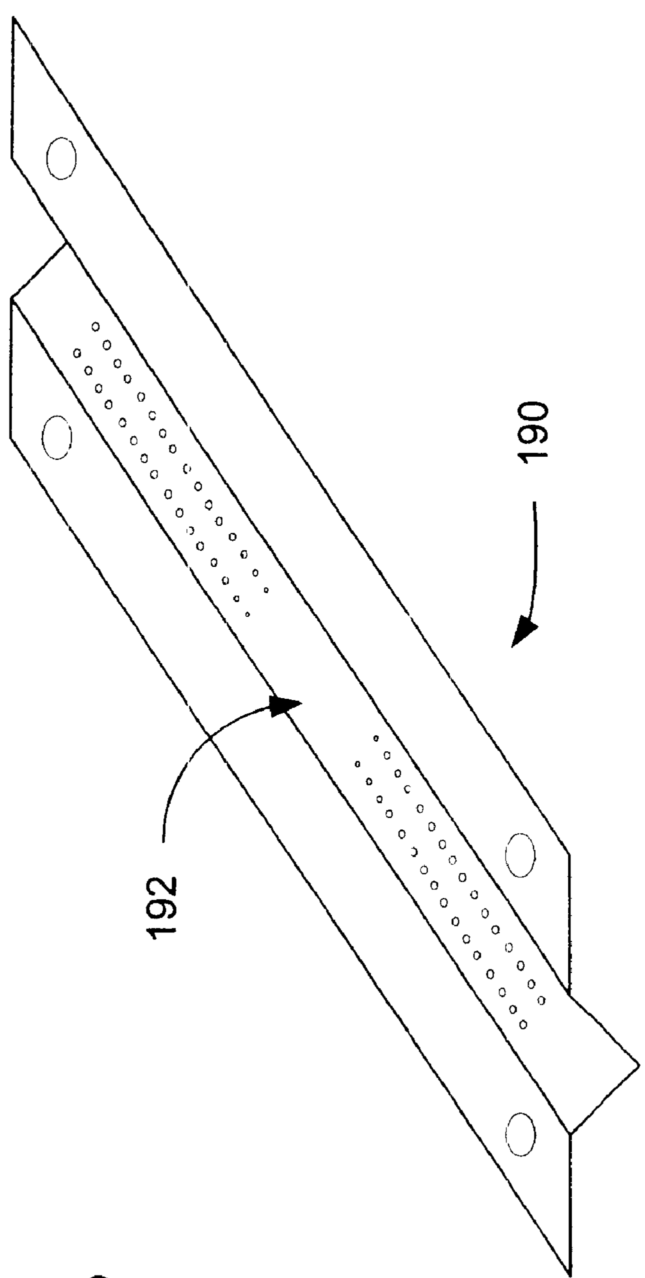
FIG. 3B is a perspective view of a sleeve holder of FIG. 1.

This can be accomplished in a variety of manners. For instance, in FIG. 3B, the sleeve holder 190 is shaped as a V-groove channel sleeve holder 190. The interior shape of the V-groove channel 192, is formed such that a decreasing amount of contact is provided between the V-channel 192 loaded, with the maximum amount of contact occurring at the center of the loaded sleeve. Another mechanism to increase contact area near the center of the loaded sleeve 140 is to have higher walls at the center of the V-groove channel 192. Heat sinking the ends of the of the V-channel provides another approach to keeping the ends cooler than at the center of the V-channel holder. As is also shown in FIG. 1, the sleeve holder 190 may be longer than the sleeve loader engager 180, such that there is a time lag before the heat shrink temperature is achieved at the distal ends of sleeve holder 190.

In another form, the composition of the V-channel sleeve holder is such that the thermal connectivity at the center is greater than it is at its ends. This can be accomplished by adjusting the composition of the material that forms the sleeve holder 190. This could alternatively be accomplished by lining the V-groove 192 with a material or composite having greater thermal conductivity at its center. In these ways a time lag can be formed, wherein the ends of sleeve holder 190 reach the heat shrink temperature later than the center does. This could also be accomplished by varying the thermal resistance within the cross section of the of the V-groove by providing holes in the sleeve holder 190 between its center and its ends. In any of these various approaches, a thermal gradient is provided between the center and ends of the V-channel sleeve holder, with the highest temperatures at the center, at least initially.

Figure 4:
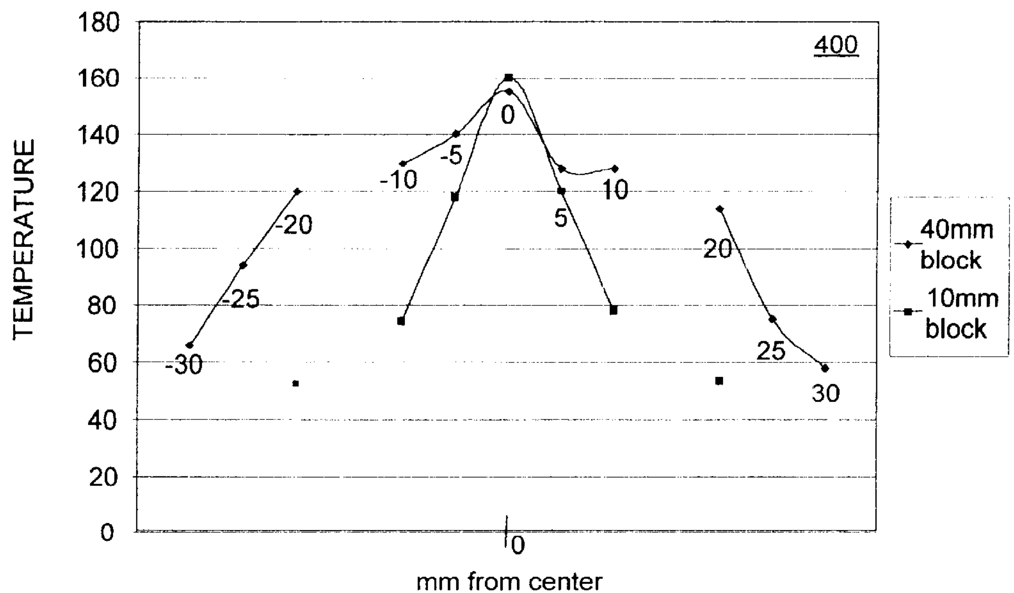
FIG. 4 is a representative plot of thermal profiles for a 10 mm and a 40 mm contact area, in accordance with the present invention.

FIG. 4 shows a representative temperature profile 400 of a 10 mm contact area and a 40 mm sleeve holder, wherein the sleeve holder is comprised of 0.012 copper for a 1 second time interval. The 10 mm thermal profile is depicted as point and line segments 410. The. 40 mm thermal profile is depicted as points and line segments 420. As can be seen, in each case the profile is highest in the center of sleeve holder 190. Similar profiles can be achieved for other lengths, as will be appreciated by those skilled in the art.

Figure 5:
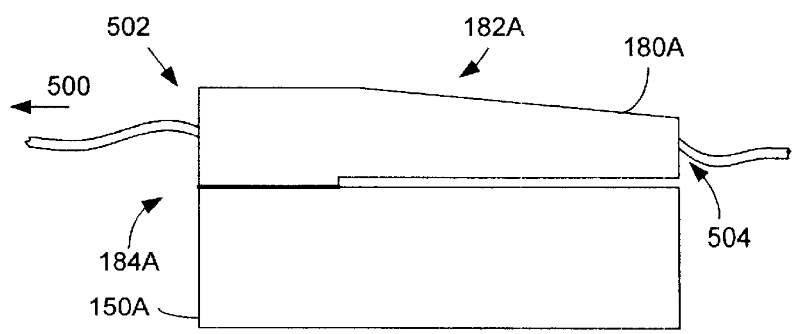
FIG. 5 is an alternative embodiment of a heater block, in accordance with the present invention.

In another form of the present invention, shown in FIG. 5, a high yield heat shrinking process may be obtained by shrinking the sleeve of a loaded sleeve 140A from one end to the other end. The heater block 150A having a loaded sleeve engager 180A is shown in FIG. 5. In such cases, the temperature applied to a loaded sleeve 140A at a first end 502 is greater than it is at a second, opposite end 504. A similar V-groove loaded sleeve holder 190 may be used, and a similar V-groove channel 182A may be formed in heater block 150. According to this approach, air is forced out of the second end 504 of the loaded sleeve 140A as the sleeve shrinks from the first end 502. Such temperature gradients may be formed in any of a variety of manners, as discussed above. Similar to the configuration of FIGS. 1, 2, and 3A, the heater block 150A may contact the loaded sleeve holder 180A and heater block 150A may include a contact area 184A proximate to the area of the sleeve holder 190A where the heat shrink temperature must be first achieved. As an example, this approach may be used for long runs of cable, wherein the loaded sleeve passes through the loaded sleeve holder 190A (engaged with loaded sleeve engager at 182A) in the direction of arrow 500. In such cases, heating chamber 120 may be configured with openings to allow the a loaded sleeve (before shrinking) in a first opening and to exit, post-shrinking from a second opening. White not shown, a heater cartridge and temperature sensor may also be provided.

The invention may be embodied in other specific forms without departing from the spirit or central characteristics thereof. The present embodiments are therefore to be considered in all respects as illustrative and not restrictive, the scope of the invention being indicated by appending claims rather than by the foregoing description, and all changes that come within the meaning and range of equivalency of the claims are therefore intended to be embraced therein.

What is claimed is:

1. A system for shrinking a sleeve loaded with a strand, said system comprising:

A. a heater, configured to generate a heat shrink temperature sufficient to shrink said sleeve; and B. a sleeve holder configured to support said sleeve and to engage said heater, wherein said sleeve holder is configured to transfer heat to said sleeve according to a predetermined temperature profile defined such that gas is not trapped within said sleeve during said shrinking.

2. A system as in claim 1, wherein, according to said temperature profile, said sleeve holder transfers said heat to a center portion of said sleeve at a higher rate than it transfers heat to each of two ends of said sleeve.

3. A system as in claim 1, wherein said sleeve holder includes a first region that reaches said heat shrink temperature before other regions of said sleeve holder.

4. A system as in claim 3, wherein said first region is oriented to bring a central portion of said sleeve to said heat shrink temperature prior to other portions of said sleeve being brought to said heat shrink temperature, such that air is not trapped within said sleeve.

5. A system as in claim 1, wherein said sleeve is a segment of sleeve.

6. A system as in claim 1, wherein said sleeve is a spool of sleeve.

7. A system as in claim 1, wherein said sleeve holder has a relatively low thermal mass.

8. A system as in claim 1, wherein said heater includes a heater block is maintained at substantially the heat shrink temperature.

9. A system as in claim 1, further comprising:

C. a chamber, configured to house said heater and sleeve holder.

10. A system for shrinking a sleeve loaded with a strand, said system comprising:

A. a heater, configured to generate a heat shrink temperature sufficient to shrink said sleeve; and B. a sleeve holder configured to support said sleeve and to engage said heater, wherein said sleeve holder is configured to transfer heat to said sleeve according to a predetermined temperature profile defined such that gas is not trapped within said sleeve during said shrinking, and wherein, according to said temperature profile, said sleeve holder transfers said heat to a first end of said sleeve at a higher rate than it transfers heat to a second end of said sleeve.

11. A system for shrinking a sleeve loaded with a strand, said system comprising:

A. a heater, configured to generate a heat shrink temperature sufficient to shrink said sleeve; and B. a sleeve holder configured to support said sleeve and to engage said heater, wherein said sleeve holder is configured to transfer heat to said sleeve according to a predetermined temperature profile defined such that gas is not trapped within said sleeve during said shrinking, wherein said sleeve holder includes a first region that reaches said heat shrink temperature before other regions of said sleeve holder and wherein said first region has a higher thermal conductivity than said other regions.

12. A system for shrinking a sleeve loaded with a strand, said system comprising:

A. a heater, configured to generate a heat shrink temperature sufficient to shrink said sleeve; and B. a sleeve holder configured to support said sleeve and to engage said heater, wherein said sleeve holder is configured to transfer heat to said sleeve according to a predetermined temperature profile defined such that gas is not trapped within said sleeve during said shrinking, wherein said sleeve holder includes a first region that reaches said heat shrink temperature before other regions of said sleeve holder and wherein said first region is configured to make first contact with said heater.

13. A system for shrinking a sleeve loaded with a strand, said system comprising:

A. a heater, configured to generate a heat shrink temperature sufficient to shrink said sleeve; and B. a sleeve holder configured to support said sleeve and to engage said heater, wherein said sleeve holder is configured to transfer heat to said sleeve according to a predetermined temperature profile defined such that gas is not trapped within said sleeve during said shrinking, wherein said sleeve holder includes a first region that reaches said heat shrink temperature before other regions of said sleeve holder and wherein said other regions have a higher thermal resistivity than said first region.

14. A system for shrinking a sleeve loaded with a strand, said system comprising:

A. a heater, configured to generate a heat shrink temperature sufficient to shrink said sleeve; and B. a sleeve holder configured to support said sleeve and to engage said heater, wherein said sleeve holder is configured to transfer heat to said sleeve according to a predetermined temperature profile defined such that gas is not trapped within said sleeve during said shrinking, wherein said sleeve holder includes a first region that reaches said heat shrink temperature before other regions of said sleeve holder and wherein at least some of said other regions include one or more heat sinks.

15. A system for shrinking a sleeve loaded with a strand, said system comprising:

A. a heater, configured to generate a heat shrink temperature sufficient to shrink said sleeve; and B. a sleeve holder configured to support said sleeve and to engage said heater, wherein said sleeve holder is configured to transfer heat to said sleeve according to a predetermined temperature profile defined such that gas is not trapped within said sleeve during said shrinking, wherein said sleeve holder includes a first region that reaches said heat shrink temperature before other regions of said sleeve holder and wherein said first region is oriented to bring a first end of said sleeve to said heat shrink temperature prior to a second end of said sleeve being brought to said heat shrink temperature, such that air is not trapped within said sleeve.

16. A system for shrinking a sleeve loaded with a strand, said system comprising:

A. a heater, configured to generate a heat shrink temperature sufficient to shrink said sleeve; and B. a sleeve holder configured to support said sleeve and to engage said heater, wherein said sleeve holder is configured to transfer heat to said sleeve according to a predetermined temperature profile defined such that gas is not trapped within said sleeve during said shrinking, wherein said sleeve holder includes a first region that reaches said heat shrink temperature before other regions of said sleeve holder and wherein said sleeve holder includes a plurality of regions having different thermal resistivities, and wherein said different regions are oriented as a function of said temperature profile.

17. A system as in claim 16, wherein said sleeve holder includes a body portion defining holes, and wherein said holes are oriented as a function of said temperature profile.

18. A system as in claim 16, wherein said relative differences of thermal resistivity is a function of said sleeve holder being comprised of materials having different thermal resistivities.

19. A system for shrinking a sleeve loaded with a strand, said system comprising:

A. a heater, configured to generate a heat shrink temperature sufficient to shrink said sleeve; and B. a sleeve holder configured to support said sleeve and to engage said heater, wherein said sleeve holder is configured to transfer heat to said sleeve according to a predetermined temperature profile defined such that gas is not trapped within said sleeve during said shrinking, wherein said sleeve holder includes a first region that reaches said heat shrink temperature before other regions of said sleeve holder and wherein said sleeve holder forms a V-groove configured to achieve said temperature profile.

20. A method of shrinking a sleeve loaded with a strand, said method comprising:

A. generating with a heater a heat shrink temperature sufficient to shrink said sleeve;

B. supporting said sleeve with a sleeve holder; and

C. shrinking said sleeve by transferring heat from said heater to said sleeve via said sleeve holder according to a predetermined temperature profile defined such that gas is not trapped within said sleeve during said shrinking.

21. A method as in claim 20, wherein, according to said temperature profile, said sleeve holder transfers said heat to a center portion of said sleeve at a higher rate than it transfers heat to each of two ends of said sleeve.

22. A method as in claim 20, wherein said sleeve is a segment of sleeve.

23. A method as in claim 20, wherein said sleeve is a spool of sleeve.

24. A method as in claim 20, wherein said sleeve holder has a relatively low thermal mass.

25. A method as in claim 20, wherein said heater includes a heater block maintained at substantially the heat shrink temperature.

26. A system as in claim 20, wherein said sleeve holder includes a first region that reaches said heat shrink temperature before other regions of said sleeve holder.

27. A method of shrinking a sleeve loaded with a strand, said method comprising:

A. generating with a heater a heat shrink temperature sufficient to shrink said sleeve;

B. supporting said sleeve with a sleeve holder; and

C. shrinking said sleeve by transferring heat from said heater to said sleeve via said sleeve holder according to a predetermined temperature profile defined such that gas is not trapped within said sleeve during said shrinking, wherein according to said temperature profile, said sleeve holder transfers said heat to a first end of said sleeve at a higher rate than it transfers heat to a second end of said sleeve.

28. A method of shrinking a sleeve loaded with a strand, said method comprising:

A. generating with a heater a heat shrink temperature sufficient to shrink said sleeve;

B. supporting said sleeve with a sleeve holder; and

C. shrinking said sleeve by transferring heat from said heater to said sleeve via said sleeve holder according to a predetermined temperature profile defined such that gas is not trapped within said sleeve during said shrinking, wherein said sleeve holder forms a V-groove configured to achieve said temperature profile.

29. A method of shrinking a sleeve loaded with a strand, said method comprising:

A. generating with a heater a heat shrink temperature sufficient to shrink said sleeve;

B. supporting said sleeve with a sleeve holder; and

C. shrinking said sleeve by transferring heat from said heater to said sleeve via said sleeve holder according to a predetermined temperature profile defined such that gas is not trapped within said sleeve during said shrinking, wherein said sleeve holder includes a first region that reaches said heat shrink temperature before other regions of said sleeve holder and wherein said first region has a higher thermal conductivity that said other regions.

* * * * *